(12) United States Patent  
Cazaux

(10) Patent No.: US 6,301,739 B1
(45) Date of Patent: Oct. 16, 2001

(54) RETRACTABLE SHOE CLEANING DEVICE FOR A VEHICLE

(76) Inventor: Fernando A. Cazaux, 2140 N. 25th Ave., Hollywood, FL (US) 33020

( * ) Notice: Subject to any disclaimer, the term of this patent is extended or adjusted under 35 U.S.C. 154(b) by 0 days.

(21) Appl. No.: 09/379,855

(22) Filed: Aug. 24, 1999

(51) Int. Cl.$^7$ ............................................. B60R 3/04
(52) U.S. Cl. ............................... 15/161; 15/112; 15/237; 280/164.2
(58) Field of Search ............... 15/112, 161, 215–217, 15/237, 238; 280/164.1, 164.2, 166

(56) References Cited

U.S. PATENT DOCUMENTS

| | | | |
|---|---|---|---|
| 803,471 | * 10/1905 | Cummings | 15/112 |
| 1,017,096 | * 2/1912 | Harris et al. | 280/164.2 |
| 1,196,453 | * 8/1916 | Hatfield | 280/164.2 |
| 1,213,079 | * 1/1917 | Cruikshank | 280/164.2 |
| 1,316,689 | * 9/1919 | Cox | 280/164.2 |
| 1,670,867 | * 5/1928 | Paskal | 15/112 |
| 1,870,333 | * 8/1932 | Kadavy | 15/237 |
| 1,946,578 | * 2/1934 | Glauber et al. | 15/237 |
| 2,962,744 | * 12/1960 | Hodgin | 15/161 |
| 2,979,340 | * 4/1961 | Morrissey | 280/164.2 |
| 3,028,617 | | 4/1962 Racina | 15/160 |
| 3,103,681 | | 9/1963 Crook | 15/237 |
| 3,165,334 | | 1/1965 Barrett | 15/237 X |
| 3,659,303 | * 5/1972 | Schroder et al. | 15/112 |
| 3,740,072 | | 6/1973 Veith | 15/237 X |
| 4,819,984 | | 4/1989 Wylie | 15/112 X |
| 5,310,201 | * 5/1994 | Routh | 280/164.2 |
| 5,636,404 | | 6/1997 Ribera | 15/161 |

FOREIGN PATENT DOCUMENTS

| | | | |
|---|---|---|---|
| 19867 | * 7/1930 | (AU) | 15/237 |
| 165777 | * 10/1955 | (AU) | 280/164.2 |
| 595279 | * 4/1934 | (DE) | 15/237 |
| 1901836 | * 8/1970 | (DE) | 15/161 |
| 807889 | * 10/1936 | (FR) | 15/238 |
| 63-279943 | * 11/1988 | (JP) | 280/166 |

* cited by examiner

Primary Examiner—Mark Spisich
(74) Attorney, Agent, or Firm—Kenneth L Tolar

(57) ABSTRACT

A shoe cleaning device for a vehicle includes a tray mounted beneath a vehicle immediately adjacent one of the door openings. Slidably received within the tray is a drawer like cleaning device including a lower wall with a pair of side panels upwardly extending therefrom. A layer of abrasive material is disposed on the lower wall. A plurality of bristle pads may be removably attached to the mat as well as the inwardly facing sides of the side panels for removing heavier debris. A motor and gear assembly automatically extends and retracts the cleaning member.

3 Claims, 3 Drawing Sheets

RETRACTABLE SHOE CLEANING DEVICE FOR A VEHICLE

BACKGROUND OF THE INVENTION

The present invention relates to a retractable shoe cleaning device which may be mounted beneath a vehicle door opening allowing a vehicle passenger to clean his or her shoes prior to entering the passenger compartment.

DESCRIPTION OF THE PRIOR ART

Each time a vehicle passenger enters the interior of a vehicle, debris that is adhering to the passenger's shoes is often deposited on the vehicle floorboard. Although various shoe scrapers and cleaning devices for vehicles exist in the prior art, they are either separate from the vehicle or are mounted thereto in a conspicuous fashion. The present invention relates to a shoe cleaning device which may be mounted to the bottom of a vehicle, immediately adjacent the lower edge of a door opening, and may be concealably retracted beneath the vehicle when not in use.

Various shoe cleaning devices exist in the prior art. For example, U.S. Pat. No. 3,028,617 issued to Racina relates to a golf shoe cleat cleaner which may be attached to a golf cart.

U.S. Pat. No. 5,636,404 issued to Ribera relates to a portable shoe cleaner for vehicles including a web belt which is secured by the closed hood of a vehicle. An independent collapsible foot support pivotally attaches at the top to a base and hooks to the belt. The device also includes a foot support pivotally attached to the top of the base and a brace pivotally attached to the bottom of the foot support.

U.S. Pat. No. 3,103,681 issued to Crook relates to a shoe scraper for vehicles including a flange having screw holes for attaching to an edge of a vehicle immediately beneath the edge of a door. A second downwardly depending flange includes openings adjacent a scraping ridge.

U.S. Pat. No. 3,740,072 issued to Veith relates to a foot cleaner device for vehicles including a bracket which mounts to the vehicle and has a nippled member pivotally secured thereto for scraping debris from one's shoes.

U.S. Pat. No. 3,165,334 issued to Barrett relates to a shoe scraper for automobiles including a vertically disposed scraper rod having an upper portion to fit in an upright position along the lower outer portion of an automobile door and a horizontally disposed lower portion for scraping one's shoes.

U.S. Pat. No. 4,819,984 issued to Wylie relates to an automobile door mat including a stationary bracket vertically disposed along the interior portion of the door and a cleaning element removably supported on the bracket.

As indicated above, numerous vehicle shoe cleaning devices exist in the prior art. However, none relate to a cleaning platform having removable bristles mounted thereon, the platform being retractable beneath and extendable from the vehicle.

SUMMARY OF THE INVENTION

The present invention relates to a shoe cleaning device for vehicles. The device comprises a tray having a lower wall with a pair of opposing side walls and a rear wall upwardly extending therefrom. Slidably mounted within the tray is a cleaning member which may be automatically extended from or retracted within the tray using a motorized gear assembly. The cleaning member includes a platform having a layer of abrasive material on its upper surface on which a passenger's shoes may be scraped to remove debris therefrom. Overlaying the abrasive surface are a plurality of removable pads each having bristles extending therefrom. The bristle pads may also be attached to vertical side walls on the cleaning platform to scrape the sides of one's shoes. It is therefore an object of the present invention to provide a shoe cleaning device which may be concealably mounted beneath a vehicle and extended therefrom.

It is another object of the present invention to provide a shoe cleaning device which may be automatically retracted beneath the vehicle.

It is yet another object of the present invention to provide a shoe cleaning device having a plurality of removable bristle pads allowing a user to selectively configure the cleaning surface. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
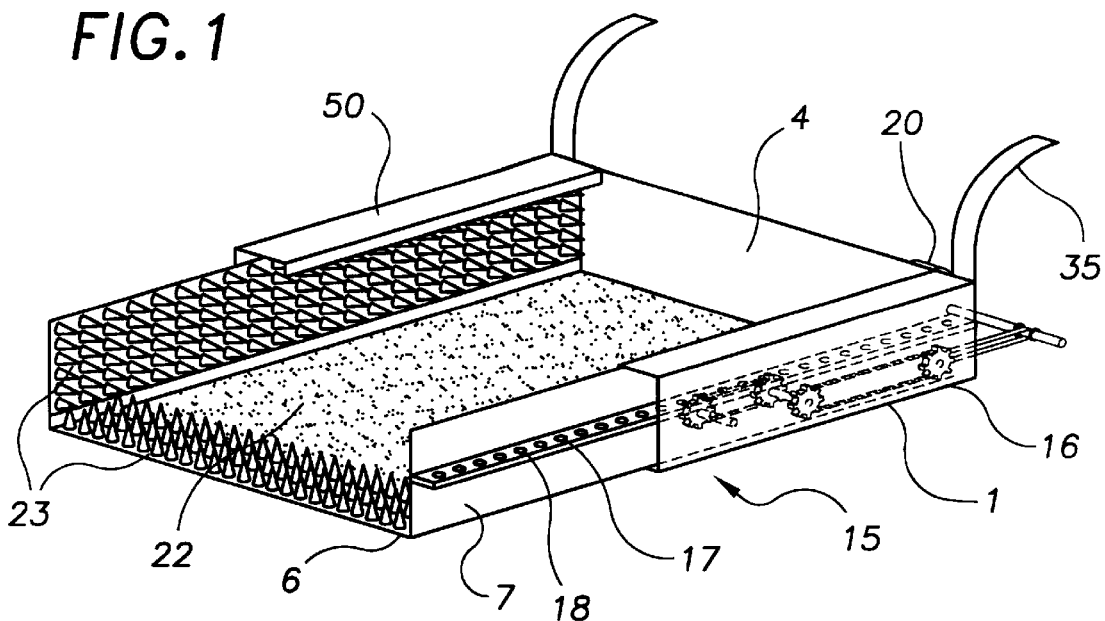
FIG. 1 is a perspective view of a first embodiment according to the present invention.
Figure 2:
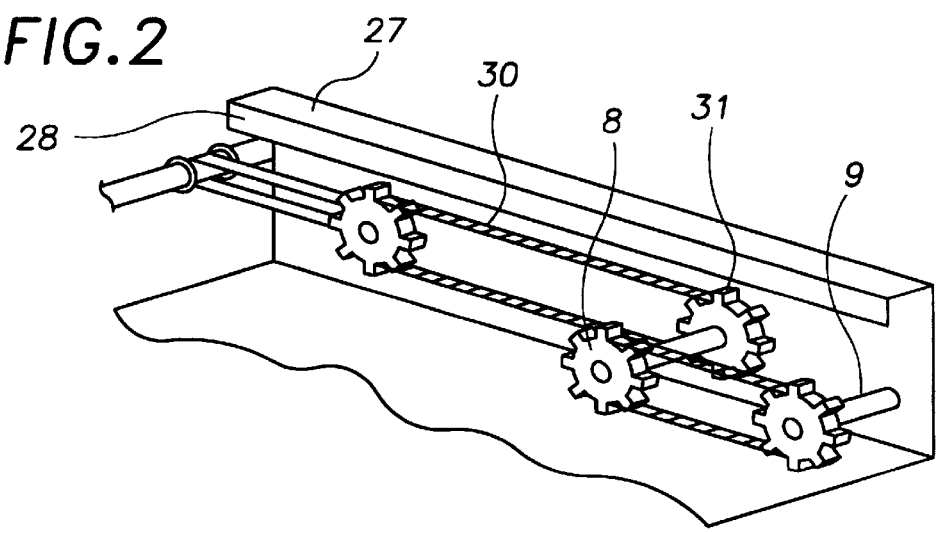
FIG. 2 is a partial detailed view of the gear mechanism according to the first embodiment.
Figure 3:
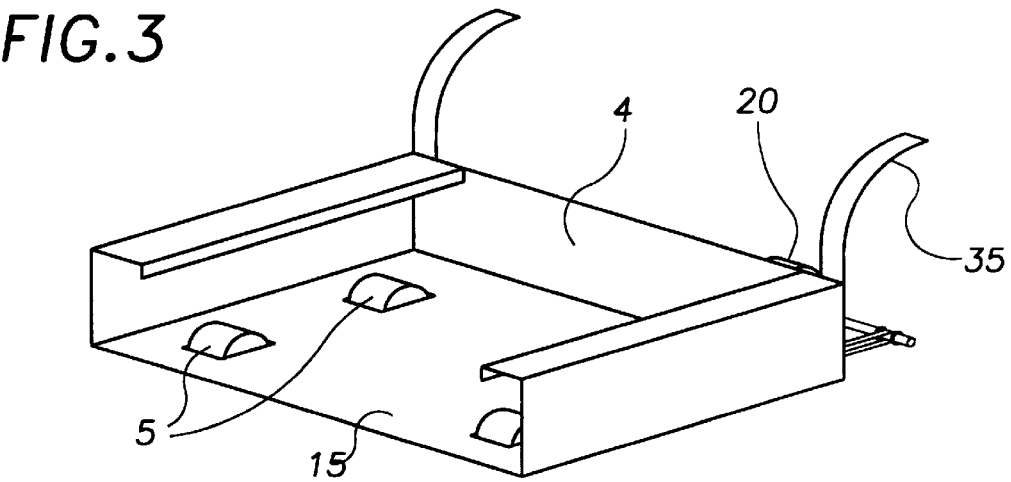
FIG. 3 is a perspective isolated view of the tray.

Referring now to FIGS. 1 through 3, a first embodiment of a shoe cleaning device for vehicles is depicted. The device comprises a tray 1 which may be mounted underneath the vehicle, preferably immediately adjacent the lower edge of a door opening. The tray includes a substantially rectangular planar horizontal lower portion 15 having four peripheral edges. Upwardly extending from each of two opposing edges is a side wall 16 each having an upper edge with a horizontal lip 50 extending inwardly therefrom. Each lip is substantially L-shaped and includes a horizontal portion 27 and vertical portion 28 depending therefrom. A rear wall 4 upwardly extends from a third edge of the lower portion and is disposed between the two opposing side walls. Partially protruding through the lower portion of the tray are a plurality of rollers 5 for assisting a shoe cleaning member in sliding into and out of the tray as will be described in more detail below. The tray is mounted beneath the vehicle with mounting braces 35 or any other similar conventional means.

The shoe cleaning member is slidably received within the tray in a drawer-like fashion. The shoe cleaning member includes a planar platform 6 with a pair of opposing side panels 7 upwardly extending therefrom. The top edge of each side panel is disposed between the vertical portion of the lip and a side wall of the tray. The lip therefore functions as a guide for the cleaning member and retains it within the tray as it extends therefrom. Disposed on the upper surface of the platform is a layer of abrasive material 22 on which a user may scrape his or her shoes to remove debris therefrom. A plurality of bristle pads 23 are removably attached to the abrasive upper layer for removing heavier debris. The bristle pads may be also removably attached to the inwardly facing sides of the cleaning member side walls 7 for removing heavy debris from the sides or heels of one's shoes.

The cleaning member may be automatically extended from and retracted within the tray using a motorized gear mechanism. A horizontal flange 17 extends from the outwardly facing side of each side panel of the cleaning member and has a plurality of aligned apertures 18 thereon. The flange 17 rests on a gear assembly that in conjunction with a motor propels and guides the cleaning member into and out of the tray. The gear assembly includes a plurality of drive gears 8 attached to rotatable axles 9 that are mounted to the inwardly facing side of each tray side wall. Each gear has a plurality of peripherally disposed teeth 31. The gears are interrelated with one or more slotted belts 30, chains or similar devices so that the gears rotate in unison. The teeth on one or more of the gears engage the apertures on the outwardly extending flange. An electric reversible motor 20 mounted on the rear wall of the tray operates a drive shaft. A belt interconnects the drive shaft with the gears. A switch means (not pictured) preferably mounted in a convenient location within the interior of the vehicle passenger compartment selectively activates the motor. The motor, when activated, will drive the gears thereby thrusting the cleaning member backwards or forward depending upon the direction of the motor.

Figure 4:
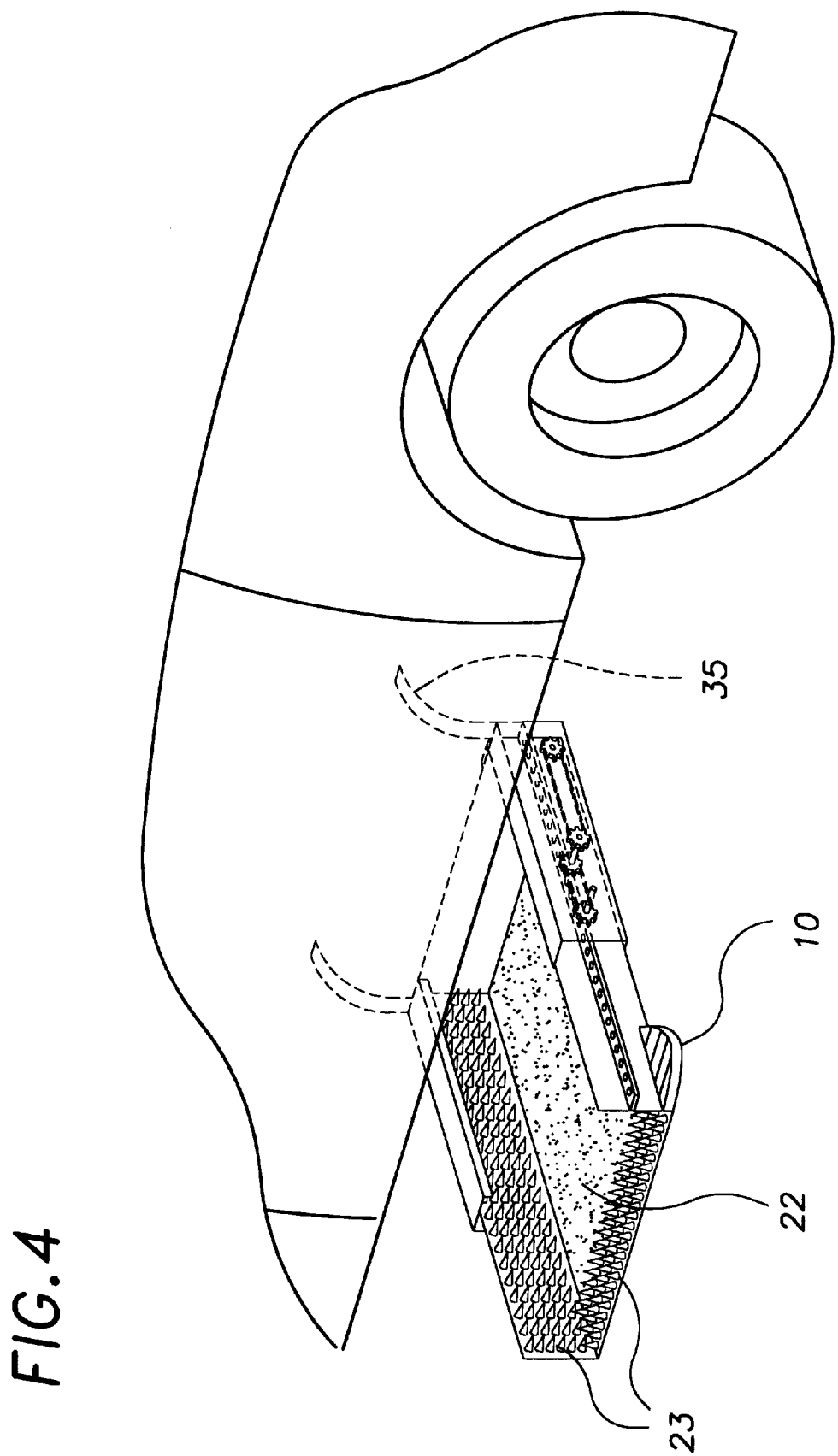
FIG. 4 depicts a second embodiment of the inventive device.

A second embodiment according to the present invention is depicted in FIG. 4. The second embodiment is substantially similar to the first embodiment with the exception that the electric motor is omitted. A handle 10 is mounted to a side panel of the cleaning member which may be grasped by a user to manually extend and retract the cleaning member.

Figure 5:
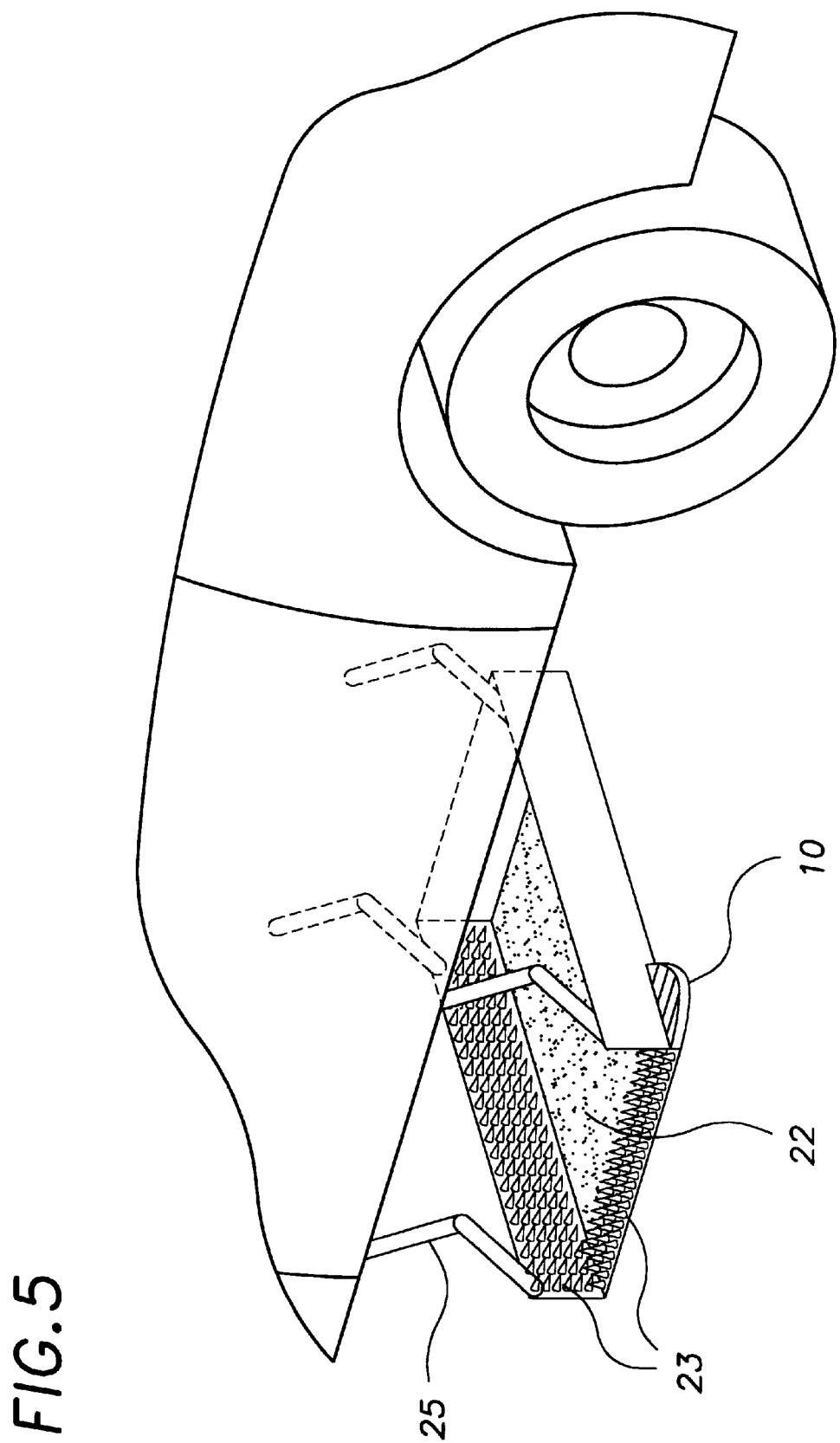
FIG. 5 depicts a third embodiment of the inventive device.

A third embodiment is depicted in FIG. 5 in which a cleaning member similar to that described above is mounted directly to the underside of the vehicle using collapsible hinges 25. Accordingly, the cleaning member may be extended outwardly and downwardly or alternatively may be collapsed inwardly and upwardly to partially or completely conceal the cleaning member.

The bristle pads may be secured to the cleaning member with hook and loop fasteners such as VELCRO® or any other similar conventional means. The abrasive surface on the cleaning member may be constructed with rubber or any other suitable material. Any conventional stop member may be used to prevent the sliding cleaning member from sliding completely out of the tray 1.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A shoe cleaning device for a vehicle comprising:

a tray mounted beneath a vehicle immediately adjacent a door opening;

a cleaning member slidably mounted within said tray, said cleaning member including a platform having an upper surface with an abrasive layer thereon on which a user scrapes a shoe; and a pair of opposing side panels upwardly extending from the upper surface of said platform, said side panels each including a plurality of bristle pads removably attached thereto;

a guide means for guiding said cleaning member into and out of said tray whereby said cleaning member may be extended from said tray when in use and retracted therewithin when not in use; said guide means including a flange extending outwardly from each cleaning member side panel, said flange including a plurality of apertures thereon; a plurality of gears rotatably mounted to said tray, each having a plurality of peripheral teeth, one of said gears engaging said flange with the gear teeth received within said apertures.

2. The shoe cleaning device for a vehicle according to claim 1 further comprising:

motor means in communication with said guide means for automatically extending and retracting said cleaning member.

3. The shoe cleaning device according to claim 1 further comprising:

a plurality of bristle pads removably attachable to the upper surface of said platform.

* * * * *